US008347066B2

(12) United States Patent
Carmean et al.

(10) Patent No.: US 8,347,066 B2
(45) Date of Patent: Jan. 1, 2013

(54) REPLAY INSTRUCTION MORPHING

(75) Inventors: Douglas M. Carmean, Beaverton, OR (US); David J. Sager, Portland, OR (US); Thomas F. Toll, Portland, OR (US); Karol F. Menezes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 11/069,004

(22) Filed: Feb. 28, 2005

(65) Prior Publication Data

US 2005/0172107 A1 Aug. 4, 2005

Related U.S. Application Data

(63) Continuation of application No. 09/608,567, filed on Jun. 30, 2000, now Pat. No. 6,880,069.

(51) Int. Cl.
*G06F 9/38* (2006.01)

(52) U.S. Cl. .................................. 712/200; 712/228

(58) Field of Classification Search .................. 712/220, 712/228

See application file for complete search history.

(56) References Cited

U.S. PATENT DOCUMENTS

| 4,920,477 | A | 4/1990 | Colwell et al. |
| 5,828,868 | A | 10/1998 | Sager et al. |
| 5,870,607 | A | 2/1999 | Netzer |
| 5,958,061 | A | 9/1999 | Kelly et al. |
| 5,966,544 | A | 10/1999 | Sager |
| 6,047,370 | A | 4/2000 | Grochowski |
| 6,052,775 | A * | 4/2000 | Panwar et al. ................. 712/215 |
| 6,058,472 | A | 5/2000 | Panwar et al. |
| 6,076,153 | A | 6/2000 | Grochowski et al. |
| 6,094,717 | A | 7/2000 | Merchant et al. |
| 6,163,838 | A | 12/2000 | Merchant et al. |
| 6,199,152 | B1 | 3/2001 | Kelly et al. |
| 6,212,626 | B1 | 4/2001 | Merchant et al. |
| 6,240,509 | B1 | 5/2001 | Akkary |
| 6,330,711 | B1 | 12/2001 | Knutson |
| 6,513,110 | B1 | 1/2003 | Keppel et al. |
| 6,594,821 | B1 | 7/2003 | Banning et al. |
| 6,625,756 | B1 | 9/2003 | Grochowski et al. |
| 6,662,361 | B1 * | 12/2003 | Jackson ....................... 717/136 |

FOREIGN PATENT DOCUMENTS

| WO | 98/21684 A2 | 5/1998 |
| WO | 02/03200 A2 | 1/2002 |
| WO | 02/003200 A3 | 10/2002 |

OTHER PUBLICATIONS

Brinmann et al., "Speculative Execution Exception Recovery using Write-back Suppression", 1993.*
International Search Report received for PCT Patent Application No. PCT/US2001/19914, mailed on Aug. 12, 2002, 1 page.
International Preliminary Examination Report received for PCT Patent Application No. PCT/US2001/19914, completed on May 22, 2003, 6 pages.

* cited by examiner

*Primary Examiner* — Eric Coleman
(74) *Attorney, Agent, or Firm* — Thomas R. Lane

(57) ABSTRACT

Replay instruction morphing. One disclosed apparatus includes an execution unit to execute an instruction. A replay system replays an altered instruction if the execution unit executes the instruction erroneously.

18 Claims, 12 Drawing Sheets

REPLAY INSTRUCTION MORPHING

CROSS-REFERENCE TO RELATED APPLICATION

This application is a continuation of U.S. patent application Ser. No. 09/608,567, which was filed on Jun. 30, 2000 now U.S. Pat. No. 6,880,069.

BACKGROUND

1. Field

The present disclosure pertains to the field of processors. More particularly, the present disclosure pertains to a processor that may alter, transform, mutate, or otherwise "morph" instructions when difficulties are encountered during one or more initial attempts to execute such instructions.

2. Description of Related Art

Improving the performance of computers or other processing systems generally improves overall throughput and/or provides a better user experience. Such improved system performance may be achieved by increasing the rate at which instructions for the system are processed by a processor. Accordingly, it is desirable to produce advanced processors with improved instruction throughput.

Continuing to increase the performance of a processor, however, is a difficult task. Prior art processors already employ techniques of branch prediction, speculative execution, and out-of-order (OOO) execution. Additionally, such processors typically include multiple parallel execution units to process numerous instructions in parallel. As increasing amounts of parallel hardware are employed, providing sufficient instructions to keep this hardware busy becomes increasingly difficult due to limited instruction level parallelism which may be extracted or due to instruction dependencies present in many existing software programs.

Multi-threading is one technique that may be used to reduce idle time for parallel execution units. Multi-threading allows multiple programs or threads to share hardware resources. Due to the separate program sequences being executed, there is less likelihood of instruction dependencies seriously reducing execution unit utilization. Such multi-threaded machines inherently benefit from the additional parallelism resulting from executing multiple threads as long as multiple threads can be extracted or are explicitly provided by the software being executed.

Thus, large amounts of effort in designing modern processors have been applied to such instruction-dispatch focused techniques. These techniques at least in part strive to increase the number of instructions dispatched to the intended execution units. At times, however, significant latency-causing problems are encountered post-dispatch (e.g., faults, numeric computation problems, cache misses, etc.). An execution unit in a prior art processor is generally "stuck" with the instruction it got once the instruction has been dispatched to the execution unit.

Instruction decoding is a type of an alteration of an instruction that occurs after an instruction is received by a processor. Instruction decoding, however, generally involves expanding an instruction into microinstructions, or changing the encoding of an instruction into a more convenient form or another instruction set for execution by an execution unit. Instruction decoding does not generally go beyond a particular mapping of an input instruction to either individual signals or individual microinstructions. Moreover, instruction decoding is an inherently front-end operation in processing systems and lacks the ability to incorporate information gleaned throughout execution of an instruction.

Thus, prior art processors generally do not morph original instructions into altered instructions that execute more efficiently or otherwise differently than the original instructions once attempted execution has occurred.

BRIEF DESCRIPTION OF THE FIGURES

The present invention is illustrated by way of example and not limitation in the figures of the accompanying drawings.

FIG. 1b illustrates techniques for morphing instructions which may be employed by the system of FIG. 1a.

DETAILED DESCRIPTION

The following description provides replay instruction morphing. In the following description, numerous specific details such as types of original and morphed instructions, circumstances under which morphing may be appropriate, system environments in which morphing may be embodied, execution unit and morphing circuitry interactions, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

The presently disclosed instruction morphing techniques may advantageously allow more efficient execution of instructions in a processing system. By morphing certain instructions when particular hardware is unavailable or when proper completion is otherwise recognized as not being presently possible, the processor may free resources for use in performing other tasks.

Figure 1A:
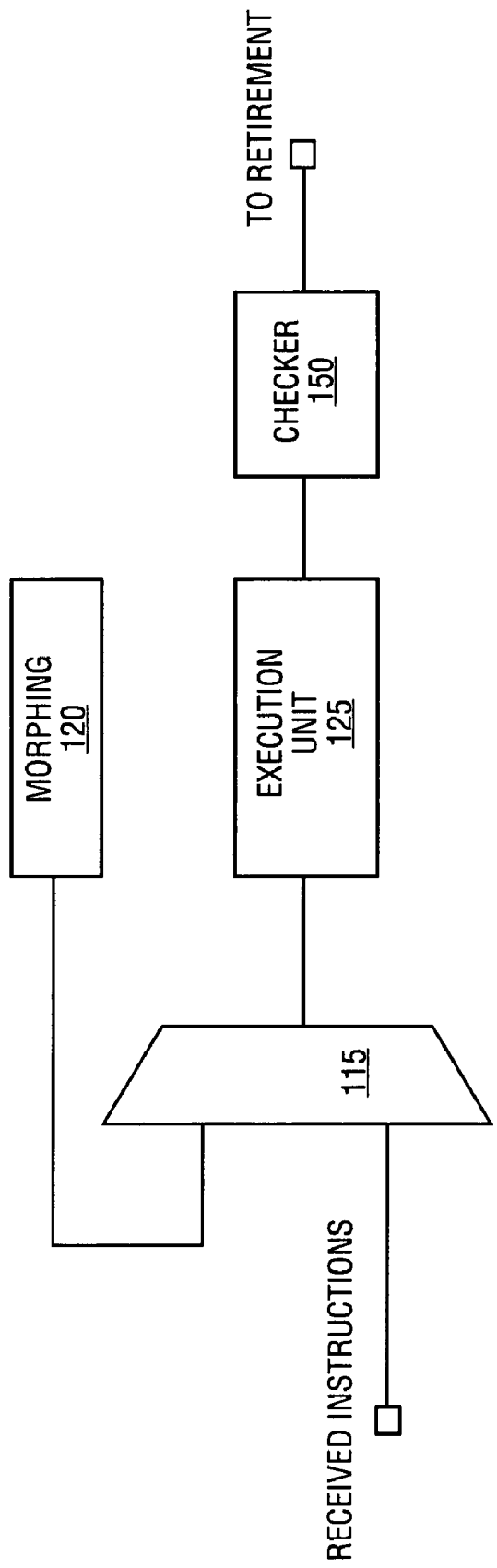
FIG. 1a illustrates one embodiment of a processor employing an instruction morphing circuit.

One embodiment of a processor that performs instruction morphing is shown in FIG. 1a. The processor of FIG. 1a includes an execution unit 125 which receives instructions from a multiplexer 115. A checker 150 is coupled to the execution unit 125 and determines whether instructions have executed properly. Additional checkers and/or execution units may be added in some embodiments. Furthermore, a staging queue (not shown) may receive instructions from the multiplexer 115 and pass the instructions to the checker 150 for checking in due course. Properly executed instructions are forwarded on to retirement, whereas improperly executed instructions are fed back to the multiplexer 115 for re-execution.

There are two ways an instruction can be fed back to the execution unit 125 from the checker 150. Morphing logic 120 is coupled to receive original instructions from the checker 150, and may detect a condition that warrants morphing of the instruction. In some cases, however, morphing is inappropriate. Therefore, the morphing logic 120 may return either the original instructions or morphed instructions to the multiplexer 115. In some embodiments, certain types of instructions or specific instructions may be automatically morphed by the morphing logic 120. In other embodiments, certain conditions may cause morphing logic 120 to perform morphing operations. Various delays may be introduced or conditions tested prior to instructions being returned to the execution unit 125.

Figure 1B:
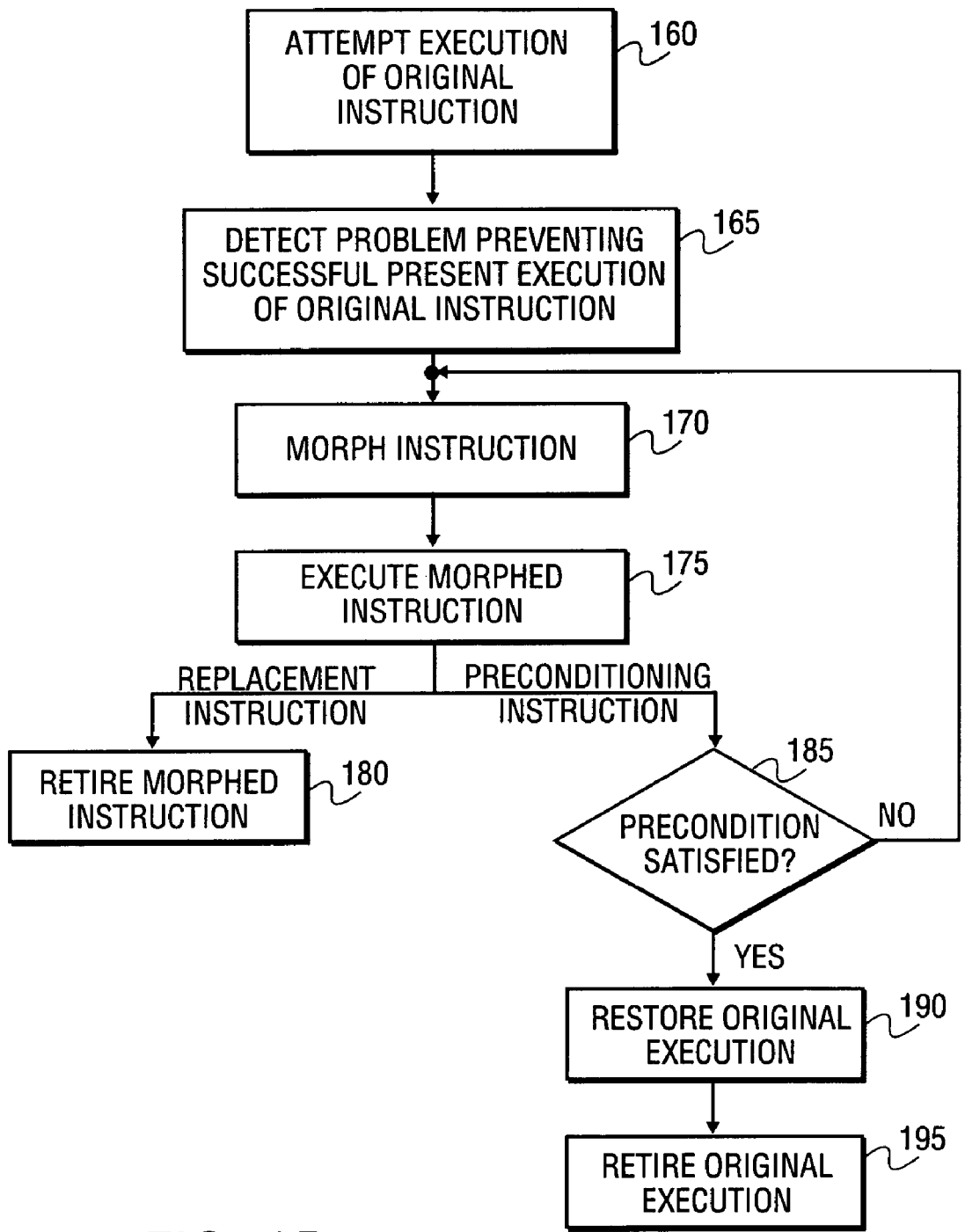

FIG. 1b illustrates two techniques for morphing instructions which may be employed by the system of FIG. 1a. At block 160, the processor attempts execution of the original instruction. The original instruction is received from the RECEIVED INSTRUCTIONS input of the multiplexer 115, and then passed to the execution unit to accomplish the execution indicated in block 160. The received instructions may be received from various decoding, caching, or other front-end processing logic.

As indicated in block 165, a problem preventing successful present execution of the original instruction is detected. In the embodiment of FIG. 1a, this detection is accomplished by the checker 150. If the instruction and/or the conditions indicate that the instruction should be replayed without alteration, the morphing logic 120 may return the instruction to the multiplexer 115 without change.

If the instruction and/or the conditions indicate that the instruction should be morphed, the morphing logic 120, as indicated in block 170, alters the instruction so that it will execute more efficiently or at least differently. Various embodiments of specific morphing operations will be discussed below. As indicated in block 175, the morphed instruction is then executed.

In some cases, the morphed instruction is intended to replace the original instruction. In this case, as indicated in block 180, retirement of the morphed instruction completes the execution which was expected from the original instruction. In this case, the morphed instruction is a substitute instruction which produces the same results as the original instruction; however, the morphed instruction was at the time perceived to be a better or more efficient way of achieving those results.

In other cases, an instruction may be morphed to satisfy a precondition to the original instruction's successful execution. For example, a memory access may cause a page fault to occur. A precondition to proper execution of the memory access is that the page fault be resolved. A particular precondition may require numerous morphing operations to satisfy. Therefore, as indicated in block 185, the processor checks to determine whether the precondition is satisfied by the execution of a morphed instruction. If not, further morphing may be performed as indicated by the return to block 170. If the precondition is satisfied, the original instruction may be restored as indicated in block 190. Thereafter, the original instruction may be retired as indicated in block 195. In some cases, a replacement instruction may be executed instead of the original instruction once the precondition has been satisfied.

Figure 2:
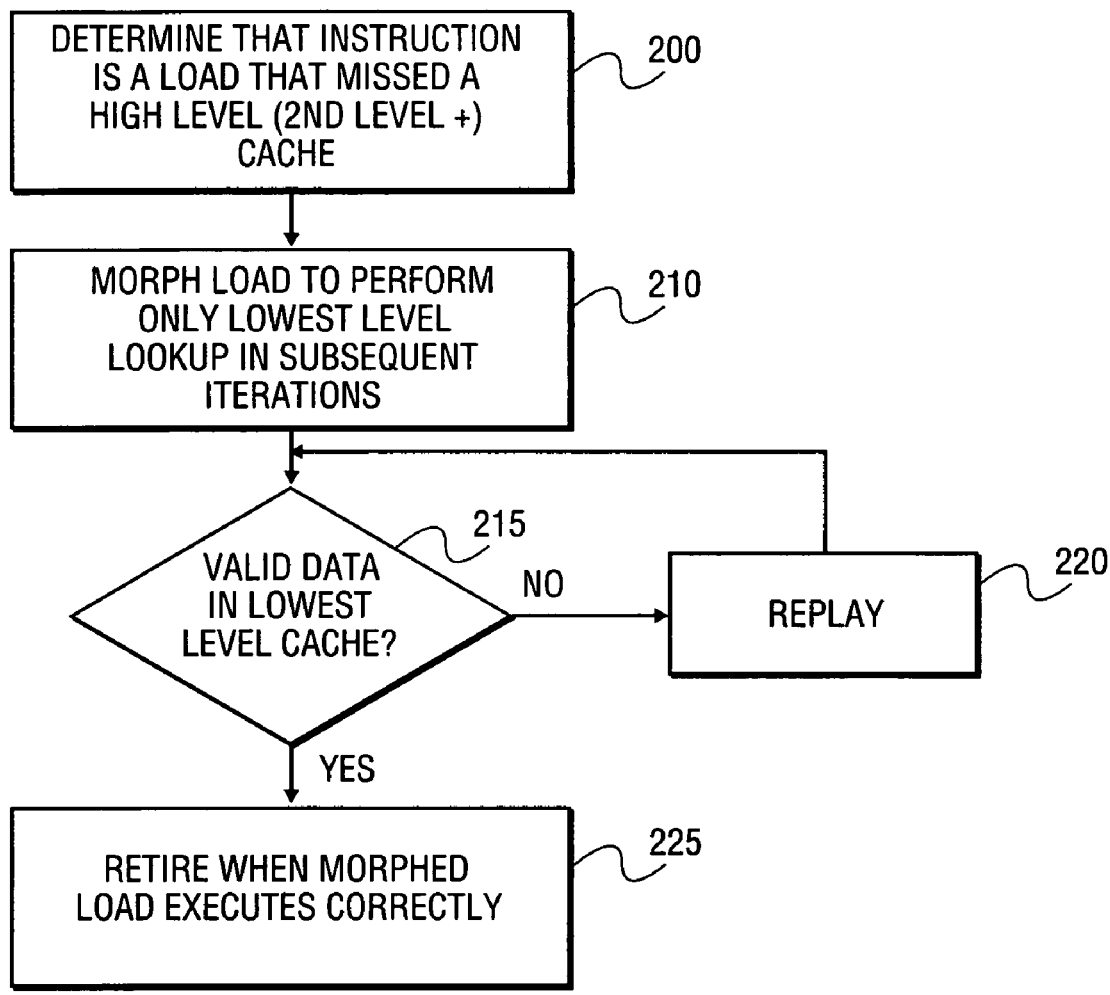
FIG. 2 illustrates one embodiment of a technique for morphing load instructions when a cache miss occurs in a cache memory.

FIG. 2 illustrates one embodiment of a technique for morphing load instructions when a cache miss occurs in a cache memory. As indicated in block 200, the processor determines that a load instruction missed in a second level or above cache. By second level, it is meant the second lowest hierarchical cache, regardless of its particular label. In the embodiment of FIG. 1a, the checker 150 receives a miss signal from the lowest level cache and therefore determines that the load instruction executed improperly. The morphing logic 120 receives signals (not shown) indicating that a higher level cache has also experienced a cache miss.

Under these conditions, it may be wasteful to continuously test the higher level cache as the load instruction circulates through the replay loop because the needed data will be written to both the higher level cache and the lowest level cache when retrieved. Therefore, bandwidth of the higher level cache may be saved by, subsequent to the higher level cache miss, only attempting to retrieve the data from the lower-level cache. Accordingly, as indicated in block 210, the load may be morphed to perform lookups only in the lowest level cache in subsequent iterations.

If valid data is found in the lowest level cache, as tested in block 215, then the load will execute properly. The original load may then be retired when the checker detects correct execution of the morphed load, as indicated in block 225. If valid data is not found in the lowest level cache, the morphed load instruction is replayed as indicated in block 220. While the load may continue to unsuccessfully execute a number of times, at least it does not wastefully consume bandwidth of the higher level cache in the process.

Figure 3A:
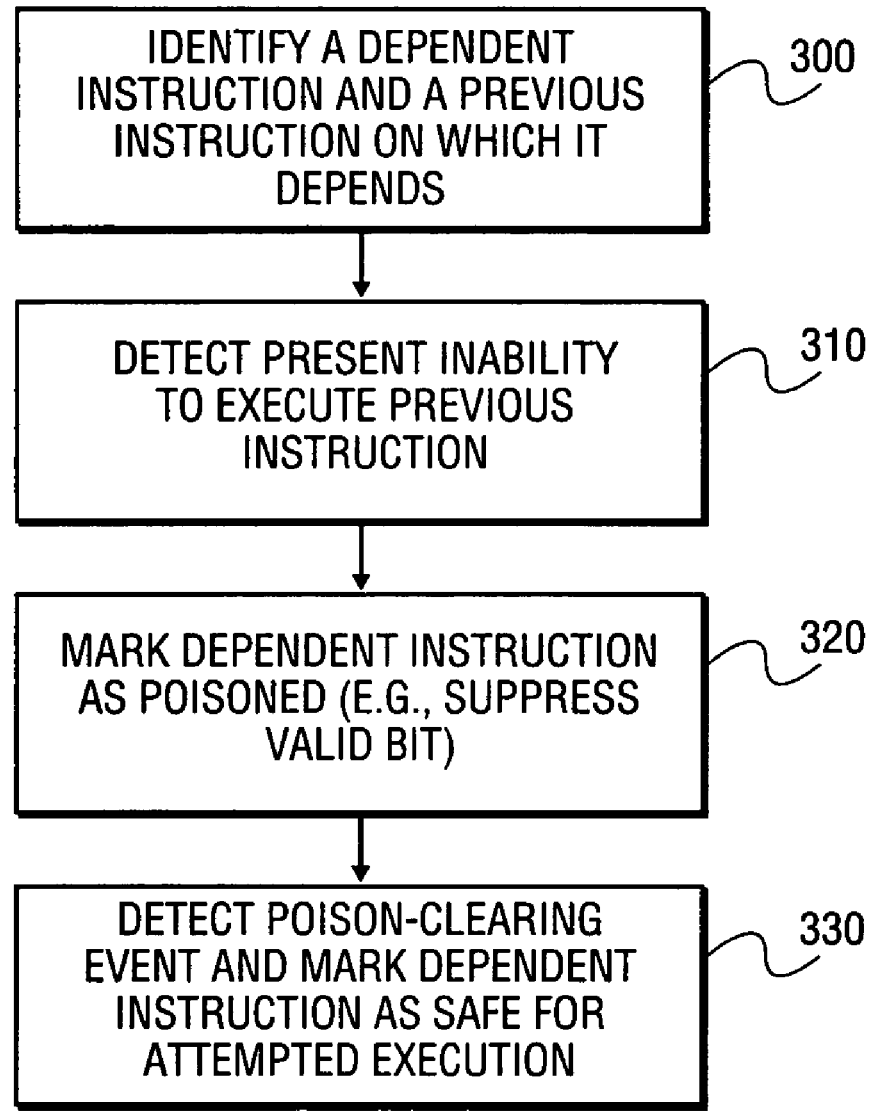
FIGS. 3a-3d illustrate various embodiments of techniques for dealing with instruction dependencies using instruction morphing.

FIG. 3a illustrates one embodiment of a technique for dealing with instruction dependencies using instruction morphing. As indicated in block 300, a dependent instruction and the previous instruction on which depends are identified. In block 310, the inability to presently execute the previous instruction is detected. In the embodiment of FIG. 1a, block 310 may be accomplished by the checker 150 detecting the erroneous execution of the previous instruction.

Since the instruction on which the dependent instruction depends cannot be properly executed, it follows that the dependent instruction cannot presently be properly executed. Therefore, continuously attempting to execute the dependent instruction may be wasteful. Accordingly, as indicated in block 320, the dependent instruction may be prevented from continuously executing by marketing the instruction as "poisoned". An instruction marked as "poisoned" is simply marked in a manner such that the replay system and/or the execution units recognize that execution of the instruction should not be attempted. For example, a valid bit may be suppressed so that the instruction appears to be invalid and therefore will not be executed. This technique may advantageously reduce the number of unsuccessful attempts at executing a dependent instruction.

As indicated in block 330, a poison-clearing event is detected. A poison-clearing event either specifically indicates that the dependency has been resolved or is an event that could have caused the dependency to be resolved. In some embodiments, tracking the exact conditions which will cause each individual dependency to be resolved may be prohibitively expensive. Therefore, common events which may cause particular dependencies to be resolved may be used to clear the poison indicators for one or more instructions. As indicated in block 330, the dependent instruction is marked as safe (not poisoned) for attempted execution.

Figure 3B:
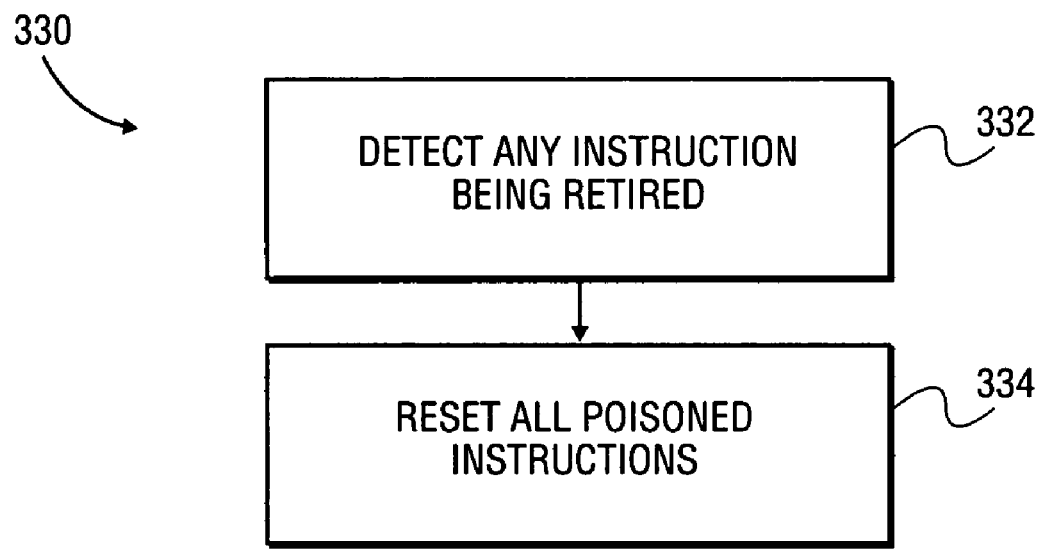

FIG. 3b illustrates one embodiment of the operations performed in block 330 of FIG. 3a. In this embodiment, the detection of any instruction retiring is performed in block 332. As a result of the detection of the retirement of any instruction, all poisoned instructions are reset so that execution will again be attempted as indicated in block 334. This embodiment is relatively inexpensive in terms of the hardware required for implementation; however, it may result in some undesirable execution of dependent instructions where the dependencies have not yet cleared.

Figure 3C:
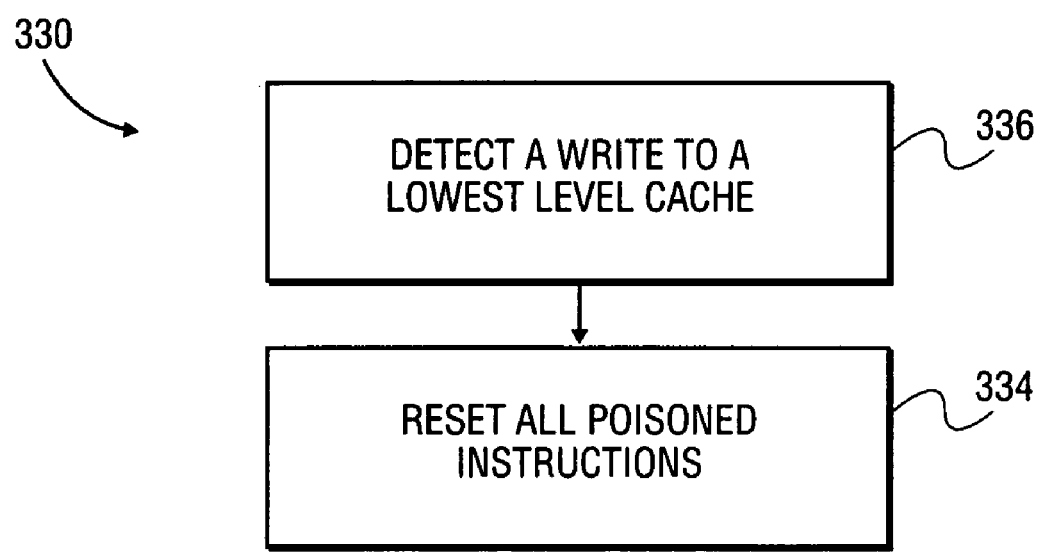

FIG. 3c illustrates another embodiment of the operations performed in block 330 of FIG. 3a. In this embodiment, a write to a lowest level cache is detected in block 336. The detection of this write causes all poisoned bits for instructions to be reset as again indicated in block 334. This technique is also convenient in terms of the amount of hardware required, but may also result in some unnecessary execution of dependent instructions.

Figure 3D:
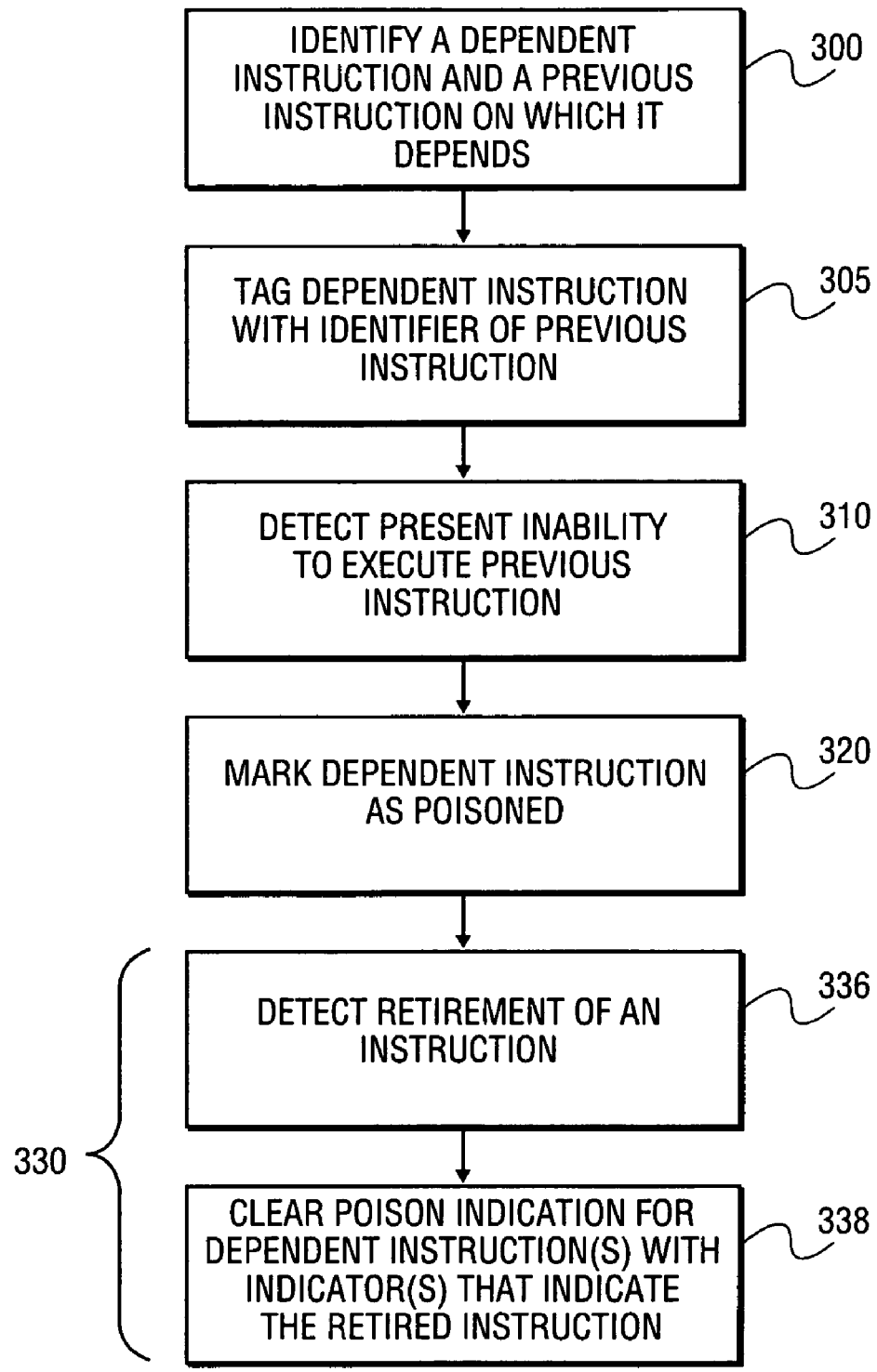

FIG. 3d illustrates another embodiment of a technique for dealing with instruction dependencies using instruction morphing. FIG. 3d shares blocks 300, 310, and 320 with FIG. 3a. After a dependent instruction and a previous instruction on which it depends are identified in block 300, however, the embodiment of FIG. 3d includes an additional operation. As indicated in block 305, the dependent instruction is tagged with an identifier that indicates the previous instruction on which it is dependent. The identifier may be a sequence number of the instruction or any other value that serves to identify the previous instruction. Notably, the tagging performed in block 305 may be performed in a different sequence than the exact sequence shown in FIG. 3d. For example, the dependent instructions may not be tagged until after one or both of blocks 310 and 320.

In block 336, the retirement of an instruction is detected. Since dependent instructions were earlier tagged with an indication of the instructions on which they depend, instruction-specific poison clearing may be performed. In other words, when an instruction retires, the poison indicators may be reset for only those instructions which depend on the retired instruction by comparing any tagged dependent instructions' indicators to the corresponding value for the instruction being retired. Thus, as indicated in block 338, the poison indication(s) for dependent instruction(s) with indicators that indicate the retired instruction are cleared. This technique may advantageously greatly reduce unnecessary execution of dependent instructions when their correct execution is precluded due to the fact that the instruction on which they are dependent has not yet been completed.

Figure 4:
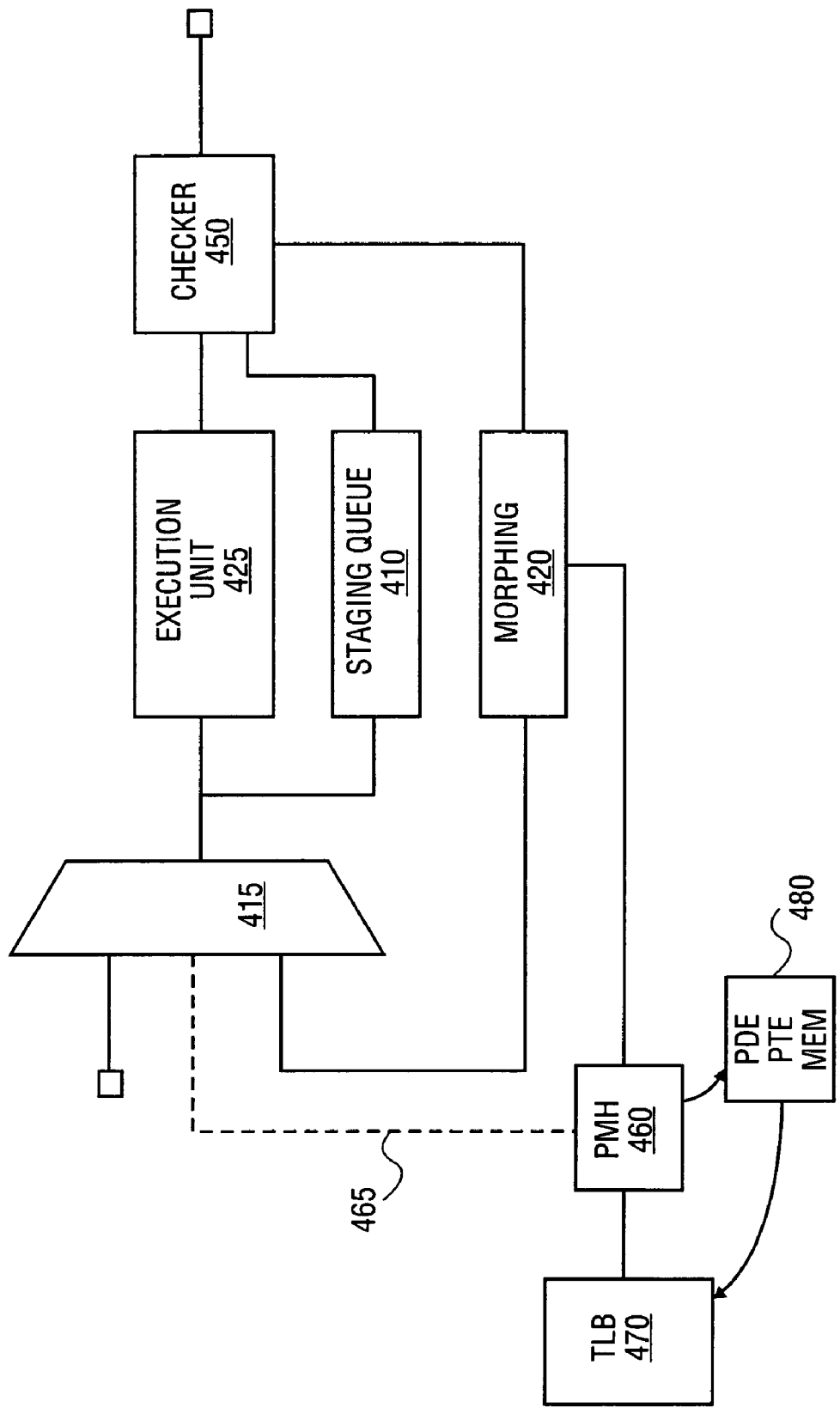
FIG. 4 illustrates another embodiment of a system that utilizes disclosed instruction morphing techniques.

FIG. 4 illustrates another embodiment of a system that utilizes instruction morphing techniques. The embodiment of FIG. 4 includes execution logic 425 which receives instructions from a multiplexer 415. Additionally, a staging queue 410 receives instructions from the multiplexer 415. The staging queue 410 stores instructions dispatched to the execution logic 425 and passes such instructions on to a checker 450, which is also coupled to the execution logic 425, to determine whether the execution logic 425 has properly executed the instructions. As was the case in the embodiment of FIG. 1a, the checker replays improperly executed instructions. Morphing logic 420 may morph instructions depending on the particular instruction and/or the conditions under which it improperly executed.

Also illustrated in FIG. 4 is a page miss handler (PMH) 460 as well as a translation lookaside buffer (TLB) 470 and a memory 480. According to known paging techniques, the system stores a number of page table entries in the TLB 470. When a page table entry is not found in TLB 470, a page walk is performed by the page miss handler 460 to retrieve the page descriptor entry (PDE) and subsequently the page table entry (PTE) from memory.

Figure 5:
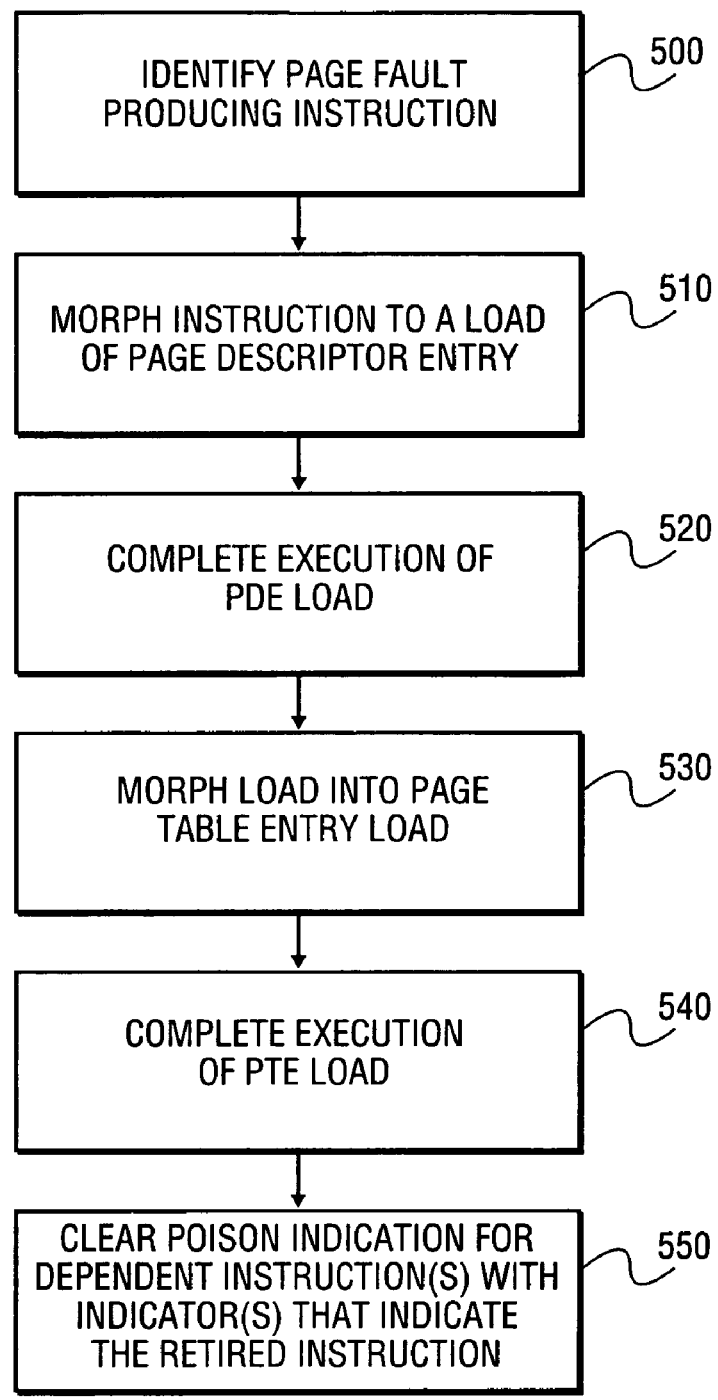
FIG. 5 illustrates one embodiment of a technique for handling page faults using instruction morphing.

FIG. 5 illustrates one embodiment of a technique for handling page faults in the system of FIG. 4. As indicated in block 500, a page fault producing instruction is identified. This may be performed by the morphing logic 420 perhaps with inputs from the execution logic 425 and/or the checker 450. As indicated in block 510, the morphing logic 420 then morphs the page fault producing instruction into a load of a page descriptor entry for the page which caused the fault. If instruction morphing were not used to introduce the page descriptor entry load into the replay system, another instruction may be prevented from executing.

For example, instead of having the morphing logic 420 perform a morphing operation to retrieve the page descriptor entry, the page miss handler could insert a page descriptor entry load into the execution stream via the dashed connection 465. This newly added instruction would displace another instruction, causing the displaced instruction to circulate again through the replay system before it is given a chance to execute. Instead, since it is known that the page fault producing instruction can not successfully execute, it may be more efficient to morph that instruction rather than displacing another instruction which could potentially successfully execute in the interim.

Similarly, after the page descriptor entry load is completed, as indicated in block 520, the page descriptor entry load may be morphed into a page table entry load (block 530). Again, this morphing technique avoids displacing another instruction. As indicated in block 540, the page table entry load completes, and the instruction may be morphed back into the original page fault producing instruction (block 550). This instruction may now execute without causing a page fault, with the page fault being resolved without displacing other operations in the replay system.

Figure 6:
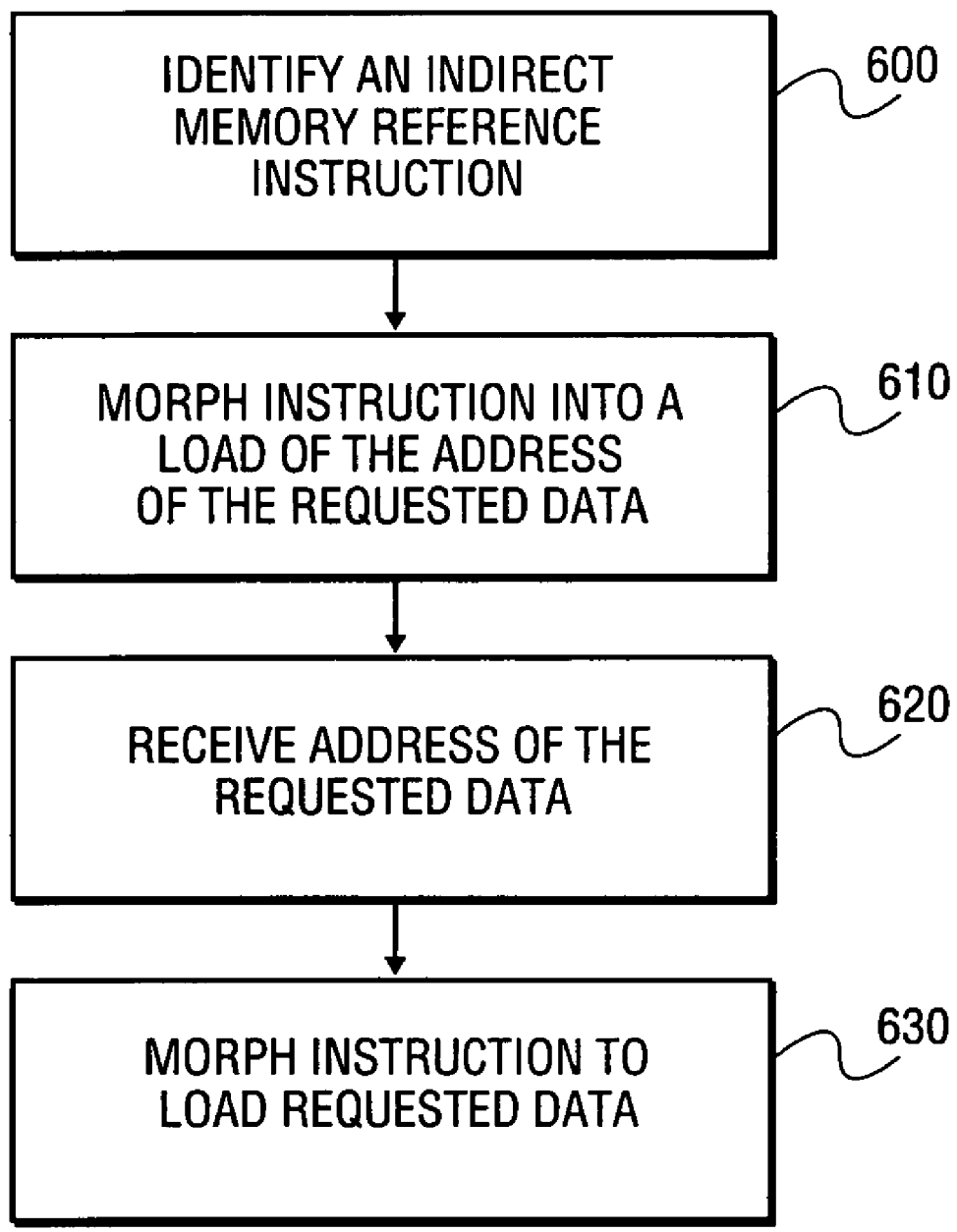
FIG. 6 illustrates one embodiment of a technique for handling indirect instructions such as indirect load instructions using instruction morphing.

FIG. 6 illustrates one embodiment of a technique for handling indirect instructions. Indirect instructions such as MOV EBX, MEM[EAX] involve two retrievals. First, the value of EAX must be retrieved in order to find the address of the data which is requested to be loaded into EBX. Second, the actual memory access to the address (the contents of EAX) of the requested data is performed. If the instruction is decoded into multiple microoperations, then additional resources are consumed. Thus, it may be advantageous to have indirect instructions which are not decoded into multiple microoperations, but rather which are morphed to perform the proper operations.

Accordingly, the technique shown in FIG. 6 may be used to allow a single microoperation to accomplish indirect addressing. In block 600, an indirect memory reference instruction is identified. Indirect memory referencing techniques and instructions are well known and will not be further discussed herein. This technique may be used for a variety of indirect or similar addressing techniques which implicitly require multiple memory or register accesses or a combination of memory and register accesses.

In block 610, the instruction is morphed into an altered instruction which loads the address of the requested data. In the above example (MOV EBX, MEM[EAX]), the value of EAX would be loaded and is received by the memory execution unit as indicated in block 620. Next, the instruction is morphed into a load of the requested data as indicated in block 630, and a load of the memory location that was indicated by the EAX register is performed. Accordingly, a single instruction slot may be used to perform indirect or similar memory access techniques.

Figure 7:
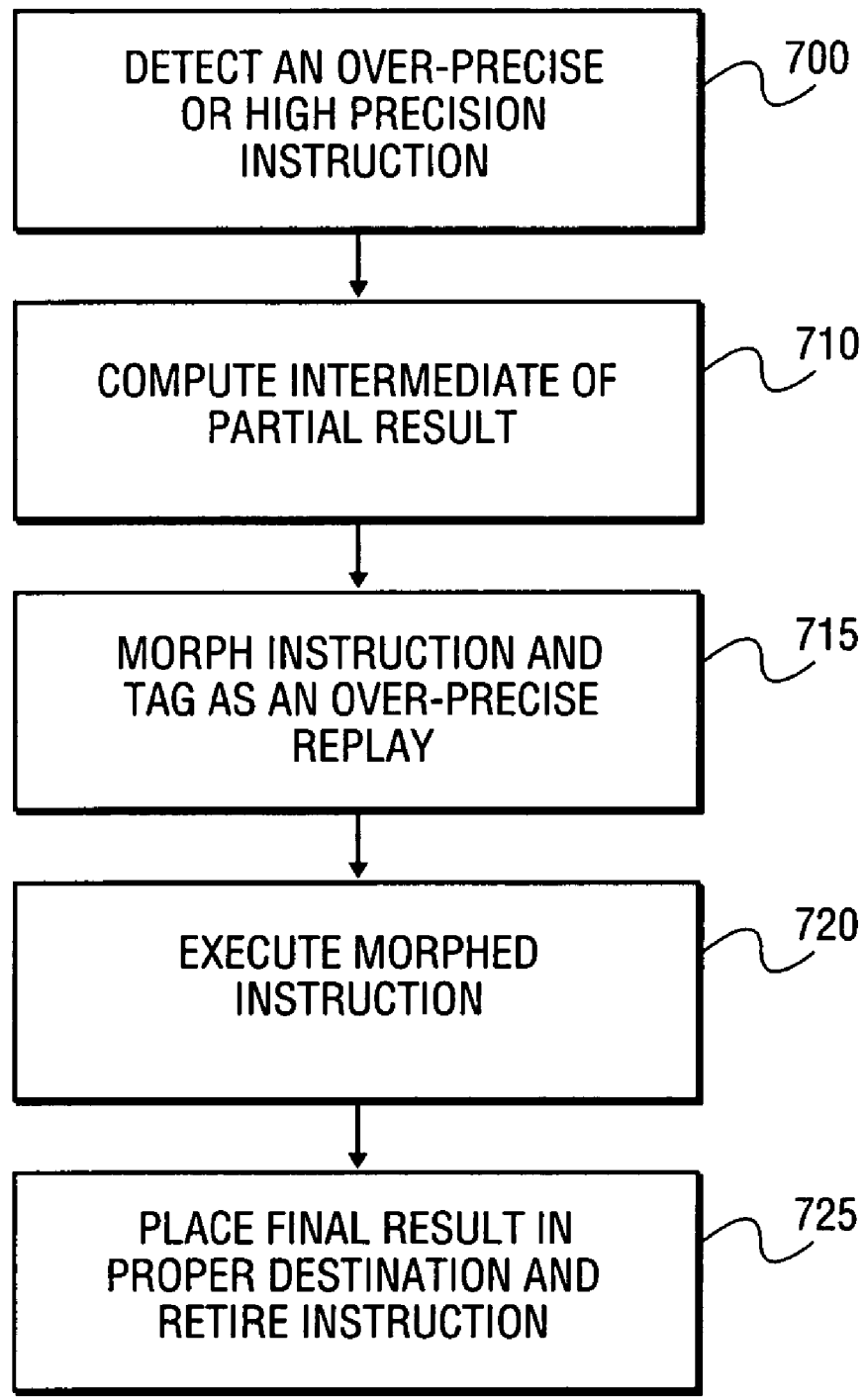
FIG. 7 illustrates one embodiment of a system that uses instruction morphing in conjunction with numerical processing.

FIG. 7 illustrates an embodiment of replay instruction morphing that deals with numerical computations. In the embodiment of FIG. 7, an over-precise or high precision case is handled specially by the replay system. An over-precise or high precision case may be either an instruction or a particular data-dependent case which requires additional cycles or hardware to compute a result to the desired precision. Thus, the need for additional resources may be due to the precision requested by the instruction or the particular numbers involved.

In block 700, the over-precise or high precision case is detected. Instead of attempting to compute the final result, the execution unit computes an intermediate result as indicated in block 710. The instruction is morphed, as indicated in block 715 and then tagged as an over-precise replay. Next, the morphed or altered instruction using the intermediate result is executed, as indicated in block 720. The final result is placed into the proper destination location as indicated in block 725.

There may be several reasons why the computation of only an intermediate result is advantageous. In some cases, it may be possible to use simpler hardware that cannot compute results for all input data in the same number of cycles. Typically, some rare cases require significant additions to hardware to ensure proper handling in the same time frame as other numbers. In such cases, the correct final result may be obtained via replay, and hardware may be saved. Additionally, some different higher precision instructions may advantageously be handled in a manner similar to lower precision instructions, except that they are passed back through the replay system to compute final and sufficiently accurate results.

Figure 8:
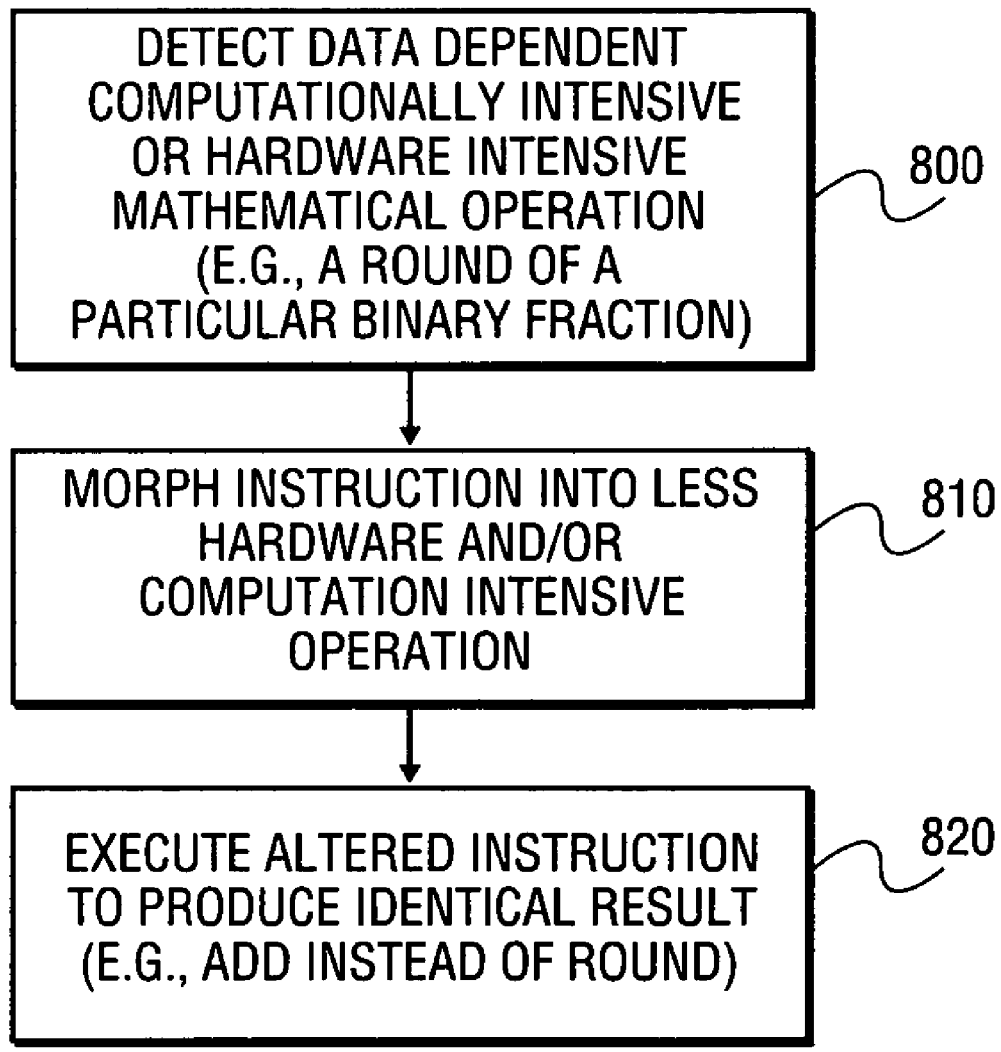
FIG. 8 illustrates one embodiment of techniques for handling certain rare data dependent mathematical operations.

Similarly, FIG. 8 illustrates one embodiment of techniques for handling certain rare data dependent mathematical operations. In the embodiment of FIG. 8, substitutions of instructions and/or operands may be performed to advantageously simplify hardware. Again, hardware otherwise needed to handle difficult and rare cases may be eliminated, resulting in a more compact part, with only rare impacts to performance.

As indicated in block 800, a data dependent computationally intensive or hardware intensive mathematical operation is detected. For example, certain round instructions are very computationally intensive and therefore require significant amounts of hardware. In block 810, the instruction is morphed into a less hardware and/or computation intensive operation. For example, a round operation may be morphed into an add instruction or a subtract instruction, depending on the exact operand involved.

Finally, the substitute operation is executed to produce the identical result as indicated in block 820. The result is "identical" to the user in that, to the precision requested, the result produced by the numerical execution unit is the same as would be produced if the original instruction had been performed. Thus, the user may be unaware that an add was performed instead of a round, but the execution unit itself may be simplified so that it need not handle rare and difficult cases.

Figure 9:
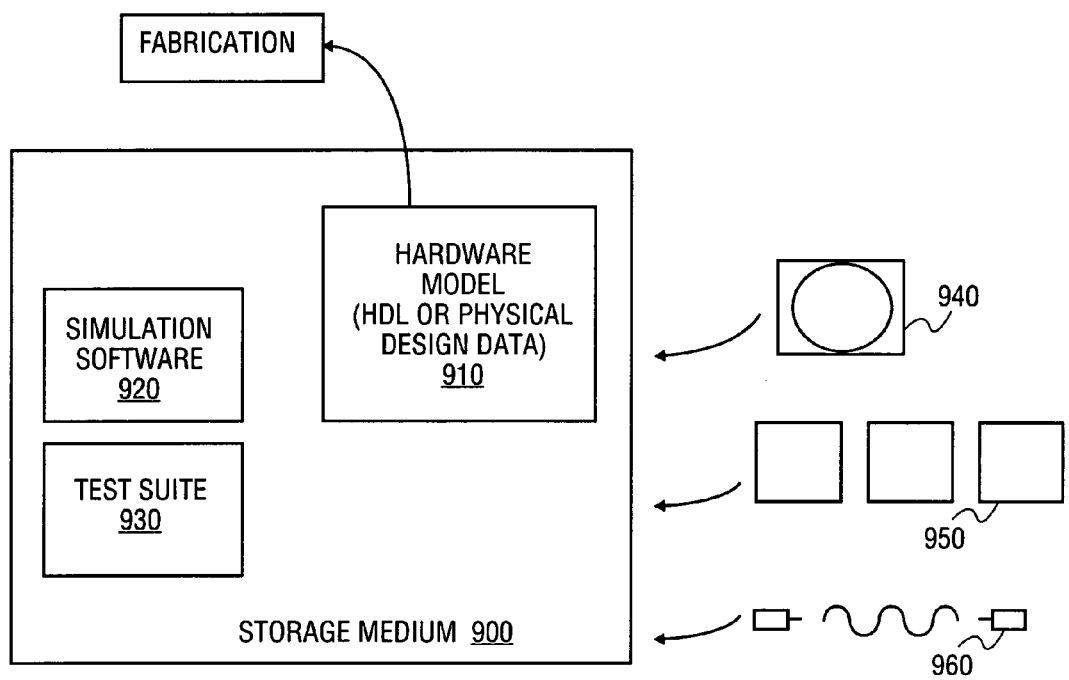
FIG. 9 illustrates various design representations or formats for simulation, emulation, and fabrication of a design using the disclosed techniques.

FIG. 9 illustrates various design representations or formats for simulation, emulation, and fabrication of a design using the disclosed techniques. Data representing a design may represent the design in a number of manners. First, as is useful in simulations, the hardware may be represented using a hardware description language or another functional description language which essentially provides a computerized model of how the designed hardware is expected to perform. The hardware model 910 may be stored in a storage medium 900 such as a computer memory so that the model may be simulated using simulation software 920 that applies a particular test suite 930 to the hardware model 910 to determine if it indeed functions as intended. In some embodiments, the simulation software is not recorded, captured, or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a computer readable medium. An optical or electrical wave 960 modulated or otherwise generated to transmit such information, a memory 950, or a magnetic or optical storage 940 such as a disc may be the medium. The set of bits describing the design or the particular part of the design are an article that may be sold in and of itself or used by others for further design or fabrication.

Thus, replay instruction morphing is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
    an execution unit to execute at least one of a plurality of instructions; and
    a replay system to change a first of the plurality of instructions to a second of the plurality of instructions, wherein the first and the second instructions are different, and wherein the first of the plurality of instructions is a memory access instruction causing a page fault and the second of the plurality of instructions is an instruction to handle the page fault or the first of the plurality of instructions is dependent on a result of a previous instruction and the second of the plurality of instructions is not executed until the previous instruction has successfully executed.

2. The apparatus of claim 1 wherein the replay system comprises:
    a replay loop to replay the original instruction under a first condition; and
    an instruction morphing circuit to replay the altered instruction under a second condition.

3. The apparatus of claim 1 wherein the replay system comprises:
    a replay loop to replay the original instruction if the original instruction is a first instruction; and
    an instruction morphing circuit to replay the altered instruction if the original instruction is a second instruction.

4. The apparatus of claim 3 wherein the first instruction is one of a plurality of non-modifiable instructions and the second instruction is one of a plurality of modifiable instructions.

5. The apparatus of claim 4 wherein the plurality of modifiable instructions are morphed only if a failure in their initial execution occurs.

6. The apparatus of claim 1 wherein said replay system tracks at least one extra bit to allow alterations of instructions.

7. The apparatus of claim 1 wherein the replay system is to replace the memory access instruction with a page table descriptor read instruction, then to replace said page descriptor read instructions with a page table entry read instruction, then to reinstate the original memory access instruction.

8. The apparatus of claim 1 wherein the replay system is to alter the dependent instruction by setting a valid bit for the dependent instruction to indicate that the dependent instruction is invalid.

9. The apparatus of claim 1 wherein the replay system is to alter the dependent instruction back into an executable form when said previous instruction retires.

10. The apparatus of claim 8 wherein the replay system is to reset the valid bit when any instruction retires.

11. The apparatus of claim 1 wherein the replay system is to track a sequence number for the previous instruction and wherein the replay system is to return the dependent instruction to an executable form when said previous instruction completes.

12. A processor comprising:
a scheduler to dispatch an original instruction;
an execution unit to attempt execution of the original instruction;
a checker to determine whether the original instruction executed properly;
a replay system comprising:
a replay loop to replay the original instruction;
a morphing circuit to a change the original instruction to a different instruction, wherein the original instruction is a memory access instruction that causes a page fault and the different instruction is an instruction to handle the page fault, or to change the original instruction is dependent on a result from a previous instruction and the different instruction is not executed until the previous instruction has successfully executed.

13. The processor of claim 12 wherein said replay system is coupled to replay the original instruction when a first condition occurs and to replay the different instruction when a second condition occurs.

14. The processor of claim 12 wherein said replay system is coupled to replay the original instruction when the original instruction is a first instruction and to replay the different instruction when the original instruction is a second instruction.

15. The processor of claim 14 wherein said first instruction is one of a plurality of non-alterable instructions and wherein said second instruction is one of a plurality of alterable instructions.

16. A method comprising:
executing an original instruction;
determining if a first condition occurs; and
if said first condition occurs, then
changing the original instruction to a different instruction, wherein the original instruction is a memory access instruction that causes a page fault and the different instruction is an instruction to handle the page fault, or changing the original instruction is dependent on a result from a previous instruction and the different instruction is not executed until the previous instruction has successfully executed; and
executing said different instruction.

17. The method of claim 16 wherein determining if the first condition occurs further comprises:
determining whether the original instruction executed improperly.

18. The method of claim 16 further comprising:
determining whether a second condition occurs;
if said second condition occurs, then
replaying said original instruction for execution.

* * * * *